United States Patent
Akimoto et al.

(10) Patent No.: US 6,707,058 B2
(45) Date of Patent: Mar. 16, 2004

(54) RADIATION IMAGE READ-OUT METHOD AND APPARATUS

(75) Inventors: Taizo Akimoto, deceased, late of Kaisei-machi (JP); by Yaeko Akimoto, legal heir, Minamiashigara (JP); by Taisuke Akimoto, legal heir, Minamiashigara (JP); by Kousuke Akimoto, legal heir, Minamiashigara (JP); Masashi Hakamata, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 222 days.

(21) Appl. No.: 10/022,807

(22) Filed: Dec. 20, 2001

(65) Prior Publication Data

US 2002/0117640 A1 Aug. 29, 2002

(30) Foreign Application Priority Data

Dec. 20, 2000 (JP) ........................ 2000-387393

(51) Int. Cl.⁷ ............................................. G02B 26/02
(52) U.S. Cl. ..................................................... 250/585
(58) Field of Search ........................................ 250/585

(56) References Cited

U.S. PATENT DOCUMENTS

| | | | |
|---|---|---|---|
| 4,778,593 A | * 10/1988 | Yamashita et al. | 250/461.2 |
| 4,816,679 A | 3/1989 | Sunagawa et al. | |
| 4,865,967 A | 9/1989 | Shiraishi et al. | |
| 4,922,103 A | 5/1990 | Kawajiri et al. | |
| 5,260,190 A | 11/1993 | Shiraishi et al. | |
| 5,270,162 A | 12/1993 | Shiraishi et al. | |
| 5,677,542 A | * 10/1997 | Ogura et al. | 250/585 |
| 5,880,470 A | * 3/1999 | Umetani et al. | 250/370.09 |
| 5,900,640 A | * 5/1999 | Ogura | 250/585 |
| 6,130,440 A | * 10/2000 | Ogura | 250/585 |
| 6,326,628 B1 | * 12/2001 | Kimura et al. | 250/585 |
| 6,566,675 B2 | * 5/2003 | Kohda | 250/586 |
| 6,573,507 B1 | * 6/2003 | Agano | 250/370.09 |

FOREIGN PATENT DOCUMENTS

| | | |
|---|---|---|
| JP | 60-111568 | 6/1985 |
| JP | 60-236354 | 11/1985 |
| JP | 4-60784 | 3/1989 |
| JP | 64-60782 | 3/1989 |
| JP | 1101540 A | 4/1989 |
| JP | 4-3952 | 1/1992 |

OTHER PUBLICATIONS

Patent Abstract of Japan, 60–111568, Jun. 18, 1985.
Patent Abstract of Japan, 60–236354, Nov. 25, 1985.
Patent Abstract of Japan, 64–060784, Mar. 1989.
Patent Abstract of Japan, 64–060782, Mar. 7, 1989.
Patent Abstract of Japan, 04–003952, Jan. 8, 1992.

* cited by examiner

Primary Examiner—G. Bradley Bennett
(74) Attorney, Agent, or Firm—Sughrue Mion, PLLC

(57) ABSTRACT

A stimulable phosphor sheet stored thereon a radiation image is two-dimensionally scanned by a stimulating light beam by projecting the light beam along a main scanning line extending in a main scanning direction and moving one of the stimulable phosphor sheet and the stimulating light beam in a sub-scanning direction relatively to the other so that the stimulable phosphor sheet is exposed to the stimulating light beam along a plurality of main scanning lines arranged in the sub-scanning direction at a predetermined pitch and stimulated emission emitted from the part of the stimulable phosphor sheet exposed to the stimulating light beam is photoelectrically converted to an electric image signal by a photoelectric convertor. The power of the stimulating light beam is controlled depending on the pitch at which the main scanning lines are arranged in the sub-scanning direction.

6 Claims, 4 Drawing Sheets

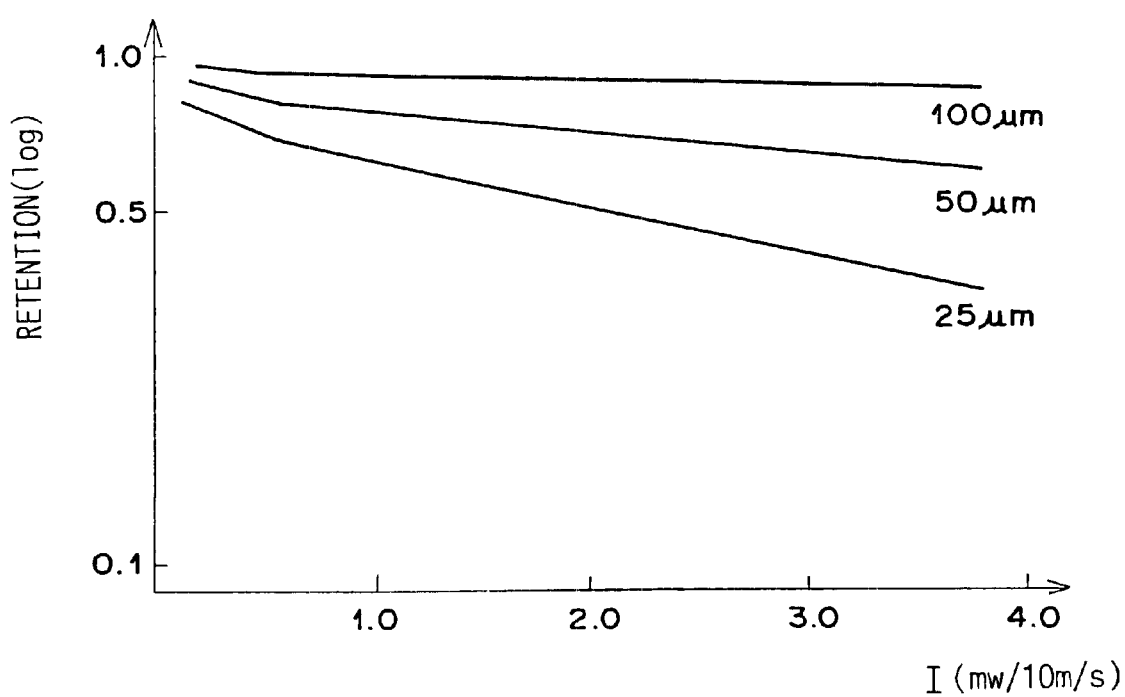

RADIATION IMAGE READ-OUT METHOD AND APPARATUS

BACKGROUND OF THE INVENTION

1. Field of the Invention

This invention relates to a radiation image read-out method and apparatus for reading out a radiation image stored on a stimulable phosphor sheet by exposing the stimulable phosphor sheet to stimulating light.

2. Description of the Related Art

When certain kinds of phosphor are exposed to a radiation, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been put into wide use as a computed radiography a radiation image recording and reproducing system using a stimulable phosphor sheet (a sheet provided with a layer of the stimulable phosphor). In the radiation image recording and reproducing system, a stimulable phosphor sheet is exposed to a radiation passing through an object such as a human body to have a radiation image information of the object stored on the stimulable phosphor sheet, a stimulating light beam such as a laser beam is caused to two-dimensionally scan the stimulable phosphor sheet, thereby causing each part of the stimulable phosphor sheet exposed to the stimulating light beam to emit the stimulated emission, and the stimulated emission is photoelectrically detected, thereby obtaining an image signal (a radiation image signal) representing the radiation image information. In the radiation image information read-out apparatus employed in the radiation image recording and reproducing apparatus, it has been proposed to use a line light source which projects a line beam onto the stimulable phosphor sheet as a stimulating light source and to use a line sensor having an array of photoelectric convertor elements extending in the main scanning direction (the longitudinal direction of the line beam) as a means for photoelectrically reading out the stimulated emission. The line beam and the line sensor are moved relative to the stimulable phosphor sheet in the sub-scanning direction (the direction substantially perpendicular to the longitudinal direction of the line beam) by a scanning means. By the use of a line beam and a line sensor, the reading time is shortened, the overall size of the apparatus can be reduced and the cost can be reduced. See, for instance, Japanese Unexamined Patent Publication Nos. 60(1985)-111568, 60(1985)-236354, and 1(1989)-101540.

As a system using the stimulable phosphor sheet, there has been wide known an autoradiography detection system in which material labeled with radioactive labeling is administered to an organism, the organism or a part of the organism is taken as a sample, the sample is overlaid on a stimulable phosphor sheet for a predetermined time interval to have radiation image information of the object stored on the stimulable phosphor sheet, a stimulating light beam such as a laser beam is caused to scan the stimulable phosphor sheet, thereby causing each part of the stimulable phosphor sheet exposed to the stimulating light beam to emit the stimulated emission, and the stimulated emission is photoelectrically detected, thereby obtaining an image signal representing the radiation image of the sample. (See, for instance, Japanese Patent Publication Nos. 1(1989)-60784, 1(1989)-60782 and 4(1992)-3952.) In the autoradiography detection system, the stimulating light is caused to scan over the entire surface of the sample by moving the optical system in both the main scanning direction and the sub-scanning direction with a stage on which the sample is placed held stationary or by moving the optical system in the main scanning direction in which the stimulating light should scan the sample at a high speed and moving the stage in the sub-scanning direction in which the stimulating light may scan the sample at a relatively low speed.

The image signal obtained in each of the aforesaid systems is subjected to image processing such as gradation processing and/or frequency processing and a radiation image of the object is reproduced as a visible image for diagnosis on the basis of the processed radiation image signal on a recording medium such as a photographic film or a display such as a fine CRT. The doctor makes a diagnosis viewing the visible image or computer analysis is carried out on the basis of the visible image.

Further, there has been developed a microarray detection system in which known binding materials, e.g., hormones, tumor markers, enzymes, antibodies, antigens, abzymes, other proteins, nucleic acids, cDNAs, DNAs, mRNAs and the like, each of which can bond to a specific organism-derived material and properties of which such as the sequence, lengths, the composition and/or the like of bases are known are spotted by a spotter on a support such as a membrane filter to form a microarray of independent spots; an organism-derived material, e.g., hormone, tumor marker, enzyme, antibody, antigen, abzyme, other protein, nucleic acid, cDNA, DNA, mRNA or the like, which is sampled from an organic body (and is chemically processed or modified as desired) and labeled with radioactive labeling is hybridized with the known binding materials on the microarray; the microarray is kept in close contact with a stimulable phosphor sheet to expose the stimulable phosphor sheet in a pattern of distribution of the radioactive labeling on the microarray; a stimulating light beam such as a laser beam is caused to scan the stimulable phosphor sheet, thereby causing the stimulable phosphor sheet exposed to the stimulating light beam to emit the stimulated emission, and the stimulated emission is photoelectrically detected, thereby analyzing the organism-derived material sampled from the organic body. In the microarray detection system, as in the autoradiography detection system, the stimulating light beam may be caused to scan over the entire surface of the support by moving the optical system in both the main scanning direction and the sub-scanning direction with a stage on which the support is placed held stationary or by moving the optical system in the main scanning direction in which the stimulating light should scan the sample at a high speed and moving the stage in the sub-scanning direction in which the stimulating light may scan the sample at a relatively low speed. In the case of the microarray detection system, since the support is small in size, the stimulating light beam may be caused to scan the surface of the support by moving the support in the main scanning direction or in both the main scanning direction and the sub-scanning direction.

In the systems where a stimulable phosphor sheet storing thereon radiation energy is two-dimensionally scanned by a stimulating light beam and stimulated emission emitted from the stimulable phosphor sheet upon stimulation by the stimulating light beam is detected, it has been conceived that since the intensity of the stimulated emission is proportional to the power of the stimulating light beam, the stimulated emission can be detected at a higher sensitivity as the power of the stimulating light beam is increased.

However, an experiment of these inventors has revealed that the sensitivity of detection cannot be increased with increase of the stimulating light power beyond a predetermined limit but deteriorates when the stimulating light power is increased beyond the predetermined limit. Further, when the read-out pitches in the sub-scanning direction are narrowed in order to meet demand for a higher resolution, the deterioration of the sensitivity of detection becomes more significant.

When the stimulating light beam scans the stimulable phosphor sheet along a main scanning line, the stimulating light beam can stimulate the stimulable phosphor sheet not only along the main scanning line but also along a main scanning line or main scanning lines following due to scattering of the stimulating light in the stimulable phosphor layer, which can results in so-called lost-reading (a part of the stimulable phosphor sheet which has been exposed to the stimulating light and emitted radiation energy is scanned by the stimulating light) and significant deterioration in the sensitivity of detection. This tendency is more significant when the read-out pitches in the sub-scanning direction are narrowed in order to meet demand for a higher resolution. Further, the experiment has revealed that the phenomenon is suppressed when the beam diameter of the stimulating light is smaller than a predetermined value since the phenomenon is due to scattering of the stimulating light in the stimulable phosphor layer.

SUMMARY OF THE INVENTION

In view of the foregoing observations and description, the primary object of the present invention is to provide a radiation image read-out method and apparatus for reading out a radiation image stored on a stimulable phosphor sheet by scanning the stimulable phosphor sheet with stimulating light in a main scanning direction and a sub-scanning direction and detecting stimulated emission emitted from the stimulable phosphor sheet upon stimulation by the stimulating light in which the radiation image can be read-out at a high sensitivity and a high resolution.

In accordance with a first aspect of the present invention, there is provided a radiation image read-out method in which a stimulable phosphor sheet stored thereon a radiation image is two-dimensionally scanned by a stimulating light beam by projecting the light beam along a main scanning line extending in a main scanning direction and moving one of the stimulable phosphor sheet and the stimulating light beam in a sub-scanning direction relatively to the other so that the stimulable phosphor sheet is exposed to the stimulating light beam along a plurality of main scanning lines arranged in the sub-scanning direction at a predetermined pitch and stimulated emission emitted from the part of the stimulable phosphor sheet exposed to the stimulating light beam is photoelectrically converted to an electric image signal by a photoelectric convertor means, wherein the improvement comprises the step of controlling the power of the stimulating light beam depending on the pitch at which the main scanning lines are arranged in the sub-scanning direction.

The stimulable phosphor sheet may be two-dimensionally scanned by the stimulating light beam, by projecting the light beam along the main scanning line extending in the main scanning direction and moving one of the stimulable phosphor sheet and the stimulating light beam in the sub-scanning direction relatively to the other, in any way. For example, a spot of the stimulating light beam may be caused to two-dimensionally scan the stimulable phosphor sheet by moving the spot of the stimulating light beam in both the main scanning direction and the sub-scanning direction with the stimulable phosphor sheet kept stationary or by moving the spot of the stimulating light beam in one of the main scanning direction and the sub-scanning direction with the stimulable phosphor sheet moved in the other of the directions. Further, the stimulable phosphor sheet may be moved in both the main scanning direction and the sub-scanning direction with the spot of the stimulating light beam kept stationary. Further, a stimulating light source which projects stimulating light on the stimulable phosphor sheet in a pattern of a line beam extending in the main scanning direction may be employed and one of the line beam and the stimulable phosphor sheet may be moved in the sub-scanning direction.

The photoelectric convertor means may be any means so long as it can convert the stimulated emission to an electric signal. For example, a photomultiplier, a CCD sensor or a line sensor comprising a plurality of photoelectric convertor elements arranged in a row may be used.

"The power of the stimulating light beam" means the amount of energy of the stimulating light projected onto the stimulable phosphor sheet and "controlling the power of the stimulating light beam" means to control the amount of energy of the stimulating light projected onto the stimulable phosphor sheet by controlling the intensity of the stimulating light beam and/or one of the scanning speed in the main scanning direction and that in the sub-scanning direction.

"Controlling the power of the stimulating light beam depending on the pitch at which the main scanning lines are arranged in the sub-scanning direction" (this pitch will be sometimes referred to as "the sub-scanning pitch" hereinbelow) means to control the power of the stimulating light beam, for instance, in the following way. The output P of the photoelectric convertor means versus the stimulating light power is as shown in FIG. 2, and in any of sub-scanning pitches of 25 μm, 500 μm and 100 μm, though increasing with increase of the stimulating light power up to a certain value, the output P of the photoelectric convertor means is rather reduced with increase of stimulating light power beyond the certain value due to the influence of radiation energy release caused by scattering of the stimulating light. Accordingly, the stimulating light power should be controlled to the value where an optimal output of the photoelectric convertor means can be obtained for each sub-scanning pitch, e.g., to $I_{25}$, $I_{50}$ or $I_{100}$ where the output of the photoelectric convertor means is maximized for each sub-scanning pitch.

For example, the power I of the stimulating light beam may be in the range of a half of $I_0$ represented by the following formula (1) to twice the same.

$$I_0 = 1/\sigma_1 \cdot \ln(1+\sigma_2/\sigma_1) \qquad (1)$$

wherein $\sigma_1$ is an absorption factor based on the retention of radiation energy represented by the ratio of an output signal of the photoelectric convertor means when the stimulating light is projected onto a first part of a stimulable phosphor sheet storing therein radiation energy to that when the stimulating light is projected onto a second part the stimulable phosphor sheet deviated from the first part in the sub-scanning direction, $\sigma_2$ is an absorption factor based on the read-out efficiency represented by the ratio of an output signal of the photoelectric convertor means when the stimulating light is projected onto a stimulable phosphor sheet storing therein radiation energy to the power of the stimulating light.

Formula (1) is derived in the following manner. That is, the relation between the output P of the photoelectric convertor means and the stimulating light power I shown in FIG. 2 can be theoretically represented by the following formula (2).

$$P = N_0 e^{-\sigma_1 \cdot I}(1 - e^{-\sigma_2 \cdot I}) \quad (2)$$

wherein $N_0$ represents the amount of radiation energy stored in the stimulable phosphor sheet, $e^{-\sigma_1 \cdot I}$ represents the retention of radiation energy on the following main scanning line when stimulating light is projected onto the stimulable phosphor sheet along a main scanning line and $(1-e^{-\sigma_2 \cdot I})$ represents the read-out efficiency represented by the ratio of an output signal of the photoelectric convertor means when the stimulating light is projected onto a stimulable phosphor sheet to the power of the stimulating light at that time. Accordingly, the retention of radiation energy $e^{-\sigma_1 \cdot I}$ is 1 and the read-out efficiency $(1-e^{-\sigma_2 \cdot I})$ is 0 when the power I of the stimulating light is 0.

The power $I_0$ of the stimulating light at which the output signal is maximized for each sub-scanning pitch is obtained when $dP/dI=0$ and is as represented by formula (1).

By substituting a value of $\sigma_1$ dependent on the read-out pitch and a value of $\sigma_2$ independent of the read-out pitch in formula (1), an optimal range of the power of the stimulating light for each pitch can be determined.

In accordance with a second aspect of the present invention, there is provided a radiation image read-out apparatus comprising stimulating light projecting means which two-dimensionally scans a stimulable phosphor sheet stored thereon a radiation image with a stimulating light beam by projecting the light beam along a main scanning line extending in a main scanning direction and moving one of the stimulable phosphor sheet and the stimulating light beam in a sub-scanning direction relatively to the other so that the stimulable phosphor sheet is exposed to the stimulating light beam along a plurality of main scanning lines arranged in the sub-scanning direction at a predetermined pitch and a photoelectric convertor means which detects stimulated emission emitted from the part of the stimulable phosphor sheet exposed to the stimulating light beam and photoelectrically converts the stimulated emission to an electric image signal, wherein the improvement comprises a stimulating light power controlling means which controls the power of the stimulating light beam depending on the pitch at which the main scanning lines are arranged in the sub-scanning direction.

For example, the stimulating light power controlling means may control the power I of the stimulating light beam in the range of a half of $I_0$ represented by the following formula (1) to twice the same.

$$I_0 = 1/\sigma_1 \cdot \ln(1 + \sigma_2/\sigma_1) \quad (1)$$

wherein $\sigma_1$ is the absorption factor based on the retention of radiation energy represented by the ratio of an output signal of the photoelectric convertor means when the stimulating light is projected onto a first part of a stimulable phosphor sheet storing therein radiation energy to that when the stimulating light is projected onto a second part the stimulable phosphor sheet deviated from the first part in the sub-scanning direction, $\sigma_2$ is the absorption factor based on the read-out efficiency represented by the ratio of an output signal of the photoelectric convertor means when the stimulating light is projected onto a stimulable phosphor sheet storing therein radiation energy to the power of the stimulating light.

The sub-scanning pitch may be, for instance, not larger than 50 μm or not larger than 25 μm.

In accordance with the present invention, since the stimulating light power is controlled depending on the sub-scanning pitch, the stimulating light power can be at such a value that can provide an optimal sensitivity at the sub-scanning pitch, whereby the radiation image can be read out at a high sensitivity and at a high resolution. Further, since the stimulating light power which will provide a highest sensitivity reduces with increase in resolution, the read-out speed can be significantly increased when the stimulating light power is reduced by increasing read-out speed (the stimulating light power can be reduced by increasing the read-out speed as described above) as the resolution increases.

When the power I of the stimulating light beam is controlled in the range of a half of $I_0$ represented by the aforesaid formula (1) to twice the same, an optimal range of the stimulating light power depending on the sub-scanning pitch can be easily obtained by only calculating values of $\sigma_1$ and $\sigma_2$ by simple measurement.

BRIEF DESCRIPTION OF THE DRAWINGS

FIG. 4 is a view showing the relation between the retention of radiation energy and the stimulating light power.

DESCRIPTION OF THE PREFERRED EMBODIMENT

Figure 1:
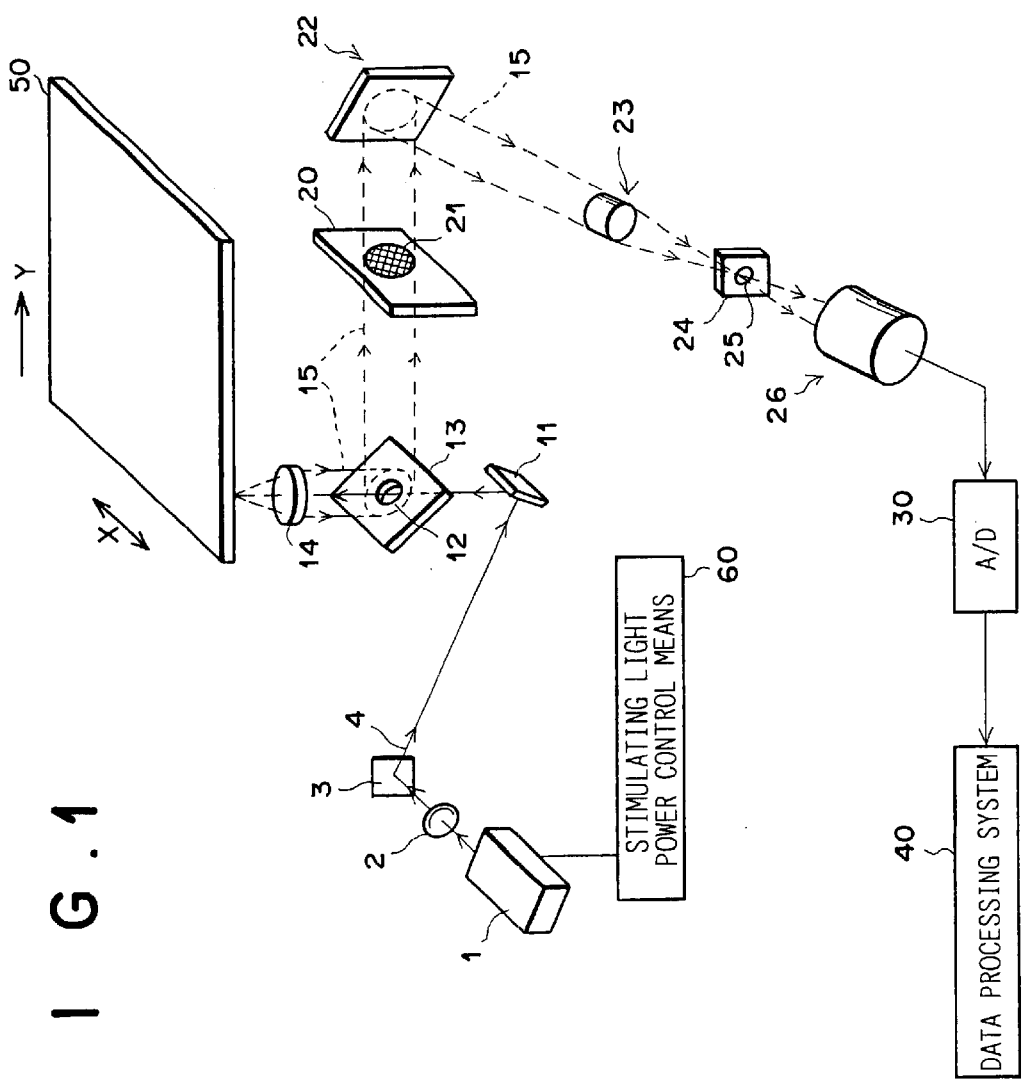
FIG. 1 is a schematic perspective view of a radiation image read-out apparatus in accordance with an embodiment of the present invention.

In FIG. 1, a radiation image read-out apparatus in accordance with an embodiment of the present invention comprises a stimulating light source 1 which emits a laser beam 4 at 640 nm, a collimator lens 2 which condenses the laser beam 4 emitted from the stimulating light source 1 into a parallel light beam, and a first mirror 3 which reflects the laser beam 4 collimated by the collimator lens 2 toward a second mirror 11. The second mirror 11 reflects the laser beam 4, reflected by the first mirror 3, toward a third mirror 13 with a central opening 12. The laser beam reflected by the second mirror 11 passes through the central opening 12 of the third mirror 13 and impinges upon a stimulable phosphor sheet 50 and stimulated emission 15 emitted from the stimulable phosphor sheet 50 upon stimulation by the laser beam 4 is reflected by the third mirror 13. The laser beam 4 passing through the central opening 12 of the third mirror 13 is condensed by a lens 14 and is caused to impinge upon the stimulable phosphor sheet 50. Further the lens 14 condenses the stimulated emission 15 into a parallel light beam. The third mirror 13 reflects the stimulated emission 15 toward a filter unit 20 provided with a stimulating light cut filter 21 which cuts the stimulating light contained in the stimulated emission 15 reflected by the third mirror 13. The stimulated emission 15 passing through the stimulating light cut filter 21 is reflected by a fourth mirror 22 and is condensed by a condenser lens 23. The stimulated emission 15 condensed by the condenser lens 23 is focused on the light receiving surface of a photomultiplier 26 by a lens 25 of an aperture 24. The photomultiplier 26 photoelectrically converts the stimulated emission 15 into an electric image signal.

The electric image signal output from the photomultiplier 26 is an analog signal and digitized by an A/D convertor 30. The digital image signal thus obtained is input into a data processing system 40.

The stimulable phosphor sheet 50 (storing thereon a radiation image) is moved by a scanning mechanism (not shown) in the directions of arrows X (the main scanning direction) and Y (the sub-scanning direction).

The radiation image read-out apparatus of this embodiment is further provided with a stimulating light power control means 60 which controls the power of the stimulating light to which the stimulable phosphor sheet 50 is exposed by controlling the power of the stimulating light source 1 and/or the read-out speed, that is, the speed at which the scanning mechanism moves the stimulable phosphor sheet 50 in the main scanning direction and the sub-scanning direction. The stimulating light power control means 60 controls the power of the stimulating light according to the read-out pitch, i.e., the pitch at which the main scanning lines which extend in the direction of arrow X and are arranged in the direction of arrow Y, and controls the stimulating light source 1 and the scanning mechanism on the basis of a LUT (not shown) which has been provided in advance and in which the power of the stimulating light source 1 and the read-out speed are related to the read-out pitch.

Figure 2:
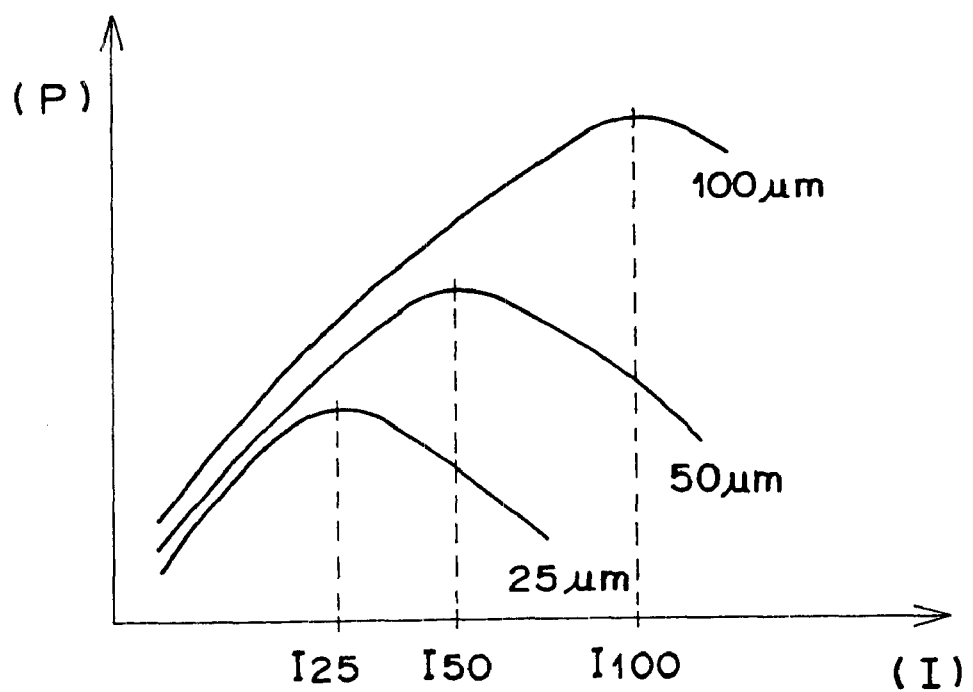
FIG. 2 is a view showing the relation between the stimulating light power I and the output P of the photoelectric convertor means when a radiation image stored in a stimulable phosphor sheet at different read-out pitches.

The stimulating light power according to the read-out pitch is obtained in the following manner. That is, when the level of the output signal of the photoelectric convertor means based on stimulated emission emitted from the stimulable phosphor sheet 50 when a stimulable phosphor sheet 50 storing thereon a predetermined radiation image is exposed to a laser beam 'stimulating light) is represented by P and the stimulating light power I at that time is represented by I, the relation between P and I is as shown in FIG. 2. In FIG. 2, the relations for sub-scanning pitches of 25 μm, 50 μm and 100 μm are shown. At any of sub-scanning pitches of 25 μm, 50 μm and 100 μm, though increasing with increase of the stimulating light power I up to a certain value, the output P of the photoelectric convertor means is rather reduced with increase of stimulating light power I beyond the certain value. It may be conceived that this is because when the stimulating light beam scans the stimulable phosphor sheet 50 along one main scanning line, the stimulating light beam can stimulate the stimulable phosphor sheet not only along the main scanning line but also along a main scanning line or main scanning lines following due to scattering of the stimulating light in the stimulable phosphor layer and release radiation energy from the main scanning line(s) following said one main scanning line. Accordingly, as shown in FIG. 2 as the sub-scanning pitch or the read-out pitch becomes narrower, the stimulating light power I at which the output P of the photoelectric convertor means starts to be reduced (will be referred to as "the threshold stimulating light power", hereinbelow) is lowered.

The relation between the output P of the photoelectric convertor means and the stimulating light power I shown in FIG. 2 can be theoretically represented by the following formula (2).

$$P = N_0 e^{-\sigma_1 \cdot I}(1 - e^{-\sigma_2 \cdot I}) \quad (2)$$

wherein $N_0$ represents the amount of radiation energy stored in the stimulable phosphor sheet, $e^{-\sigma_1 \cdot I}$ represents the retention of radiation energy on the following main scanning line when stimulating light is projected onto the stimulable phosphor sheet along a main scanning line and $(1 - e^{-\sigma_2 \cdot I})$ represents the read-out efficiency represented by the ratio of an output signal of the photoelectric convertor means when the stimulating light is projected onto a stimulable phosphor sheet to the power of the stimulating light at that time. Accordingly, the retention of radiation energy $e^{-\sigma_1 \cdot I}$ is 1 and the read-out efficiency $(1 - e^{-\sigma_2 \cdot I})$ is 0 when the power I of the stimulating light is 0.

Figure 3:
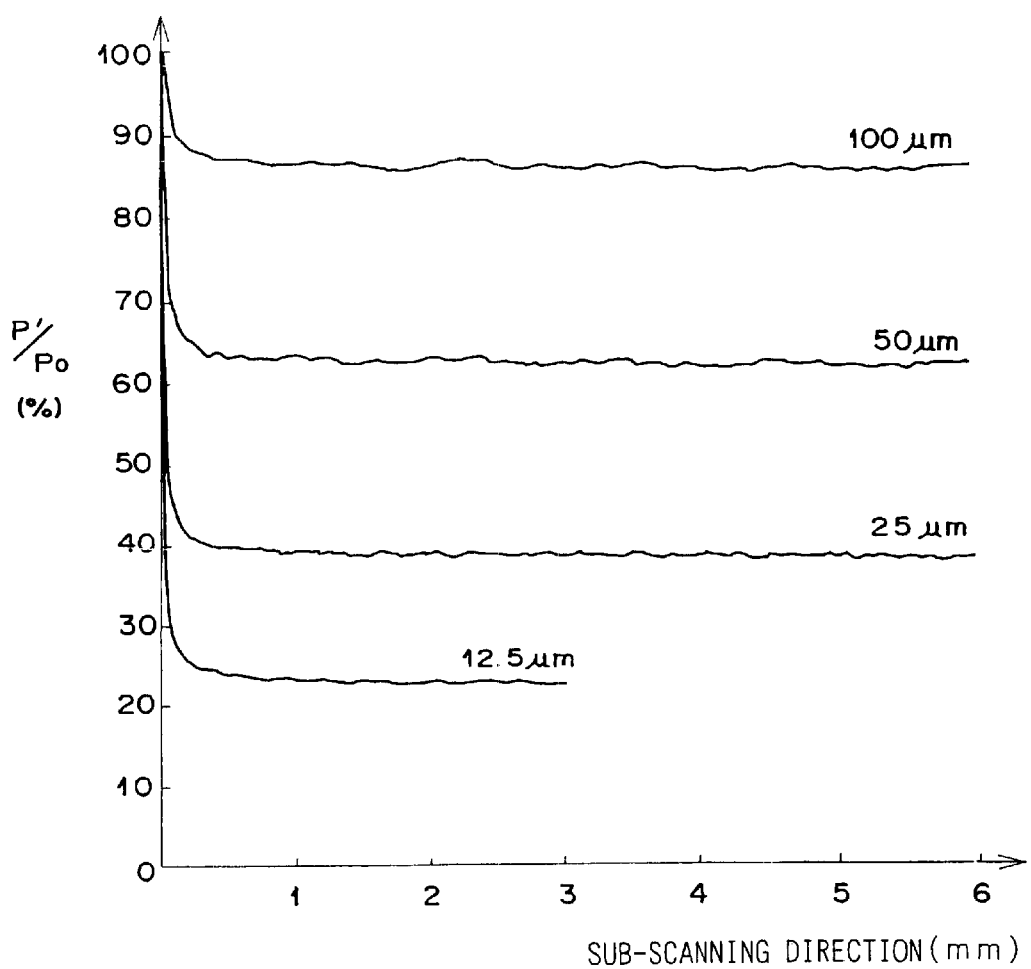
FIG. 3 is a view showing the relation between the ratio P'/P$_0$ of the average P$_0$ of the output of the photoelectric convertor means for the initial main scanning line when a stimulable phosphor sheet on which a radiation image has been recorded at a predetermined substantially uniform density is read and the average P' of the output of the photoelectric convertor means for a second main scanning line shifted from the initial main scanning line in the sub-scanning direction and the distance between the initial main scanning line and the second main scanning line.

FIG. 3 is a view showing the relation between the relative value $P'/P_0$ of the average $P_0$ of the output of the photoelectric convertor means for the initial main scanning line when a stimulable phosphor sheet 50 on which a radiation image has been recorded at a predetermined substantially uniform density is read and the average $P'$ of the output of the photoelectric convertor means for a second main scanning line shifted from the initial main scanning line in the sub-scanning direction Y and the distance between the initial main scanning line X and the second main scanning line X in the sub-scanning direction Y. As shown in FIG. 3, at any read-out pitch, the relative value $P'/P_0$ is sharply reduced as the distance between the initial main scanning line and the second main scanning line increases up to a certain value P, and is kept substantially constant thereafter. As the stimulating light power I is changed, the value of $P/P_0$ changes as shown in FIG. 4. In FIG. 4, the ordinate represents the natural logarithm of $P/P_0$. The relation shown in FIG. 4 can be obtained from the aforesaid formula (2) in the following manner.

$$P/P_0 = N_0 e^{-\sigma_1 \cdot I}(1 - e^{-\sigma_2 \cdot I})/N_0 \cdot 1 \cdot (1 - e^{-\sigma_2 \cdot I})$$

$$P/P_0 = e^{-\sigma_1 \cdot I}$$

Accordingly, $\ln(P/P_0) = -\sigma_1 \cdot I$

Accordingly, $\sigma_1$ is represented by the gradient of each line in FIG. 3 and can be determined for each read-out pitch.

By substituting in formula (2) the value of $\sigma_1$ for the stimulating light power I thus obtained, the value of $\sigma_2$ can be obtained as follows.

When the levels (measured values) of the output signal obtained when the stimulable phosphor sheet 50 is scanned by stimulating light beams of different powers I and 2I at the same sub-scanning pitch are represented by $P_2$ and $P_1$, $$P_2 = N_0 e^{-\sigma_1 \cdot 2I}(1 - e^{-\sigma_2 \cdot 2I})$$

$$P_1 = N_0 e^{-\sigma_1 \cdot I}(1 - e^{-\sigma_2 \cdot I})$$

When $e^{-\sigma_2 \cdot I}$ is represented by X, $$P_2/P_1 = e^{-\sigma_1 \cdot I}(1 - X^2)/(1 - X) = e^{-\sigma_1 \cdot I}(1 + X)$$

$$X = (P_2/P_1)e^{\sigma_1 \cdot I} - 1$$

$$e^{-\sigma_2 \cdot I} = (P_2/P_1)e^{\sigma_1 \cdot I} - 1$$

Accordingly, $$-\sigma_2 \cdot I = \ln\{(P_2/P_1)e^{\sigma_1 \cdot I} - 1\}$$

$$\sigma_2 = (-1/I)\ln\{(P_2/P_1)e^{\sigma_1 \cdot I} - 1\}$$

By substituting the values of $\sigma_1$ and $\sigma_2$ in the aforesaid formula (1), the stimulating light power $I_0$ can be obtained. It is preferred that the power I of the stimulating light beam be in the range of a half of $I_0$ to twice the same.

In this manner, the power of the stimulating light depends upon the read-out pitch since σ1 is an absorption factor depending on the read-out pitch.

The scanning mechanism may be of any structure so long as it can move the stimulable phosphor sheet 50 in X-Y directions. For example, the scanning mechanism may comprise a conveyor belt or may move the stimulable phosphor sheet 50 holding its end portion.

The stimulating light source need not be limited to that in this embodiment but may be of any structure. For example, the stimulating light source may be a line light source or a light source having an optical system which causes a laser beam to scan the stimulable phosphor sheet 50 along a main scanning line while the stimulable phosphor sheet 50 is conveyed in the sub-scanning direction. Further, the stimulating light source may be that in which a stimulating light beam is caused to two-dimensionally scan the stimulable phosphor sheet 50 with the stimulable phosphor sheet 50 kept stationary.

The filter 21 is impermeable to light at 640 nm, light having the same wavelength as the stimulating light, and permeable to the stimulated emission shorter than 640 nm in wavelength.

The lenses 14 and 23 form a confocal optical system. When the lenses 14 and 23 form a confocal optical system, a high-resolution, high-S/N output signal can be obtained.

The aperture 24 is positioned on a focal point of the lens 23 and it is preferred that the diameter of the lens 25 of the aperture 24 be set taking into account the fact that the light emitting points of the stimulable phosphor sheet which emit stimulated emission distribute in the direction of depth of the stimulable phosphor layer and that the light emitting points move in the direction of depth of the stimulable phosphor layer.

Further, though, in the embodiment described above, a photomultiplier is employed as a photoelectric convertor means for photoelectrically converting the stimulated emission to an electric image signal, the photoelectric convertor means may be a CCD sensor or a line sensor comprising a plurality of photoelectric convertor elements arranged in a row may be used.

Operation of the radiation image read-out apparatus of this embodiment will be described, hereinbelow. First the scanning mechanism conveys the stimulable phosphor sheet 50 in the direction of arrow Y to a position where the laser beam is projected onto the stimulable phosphor sheet 50.

Then the read-out pitch is input into the stimulating light power control means 60 through a predetermined input means (not shown). The stimulating light power control means 60 obtains the intensity of the stimulating light and the read-out speed according to the read-out pitch from the LUT, and controls the stimulating light source 1 to emit a laser beam at the intensity. The laser beam 4 emitted from the stimulating light source 1 is converted to parallel light by the collimator lens 2 and then reflected by the first mirror 3. The laser beam 4 reflected by the first mirror 3 is further reflected by the second mirror 11 and impinges upon the stimulable phosphor sheet 50 through the central opening 12 of the third mirror 13. The stimulated emission 15 emitted from the stimulable phosphor sheet 50 upon exposure to the laser beam 4 is converted to parallel light by the lens 14 and reflected by the part of the third mirror 13 around the central opening 12 to impinge upon the stimulating light cut filter 21. After passing through the stimulating light cut filter 21, the stimulated emission 15 is reflected by the fourth mirror 22 and condensed by the lens 23. The stimulated emission 15 condensed by the lens 23 is focused on the light receiving surface of the photomultiplier 26 by the aperture 24 and is photoelectrically converted into an analog image signal component by the photomultiplier 26.

The scanning mechanism moves the stimulable phosphor sheet 50 in the direction of arrow X at a read-out speed according to the read-out pitch input from the stimulating light power control means 60, whereby a plurality of analog image signal components are output in sequence from the photomultiplier 26. After scanning in the direction of arrow X, the scanning mechanism moves the stimulable phosphor sheet 50 in the direction of arrow Y. In this manner, the stimulable phosphor sheet 50 is two-dimensionally scanned by the laser beam 4.

In accordance with the present invention, since the stimulating light power is controlled depending on the sub-scanning pitch, the stimulating light power can be at such a value that can provide an optimal sensitivity at the sub-scanning pitch, whereby the radiation image can be read out at a high sensitivity and at a high resolution.

When the power I of the stimulating light beam is controlled in the range of a half of $I_0$ represented by the aforesaid formula (1) to twice the same, an optimal range of the stimulating light power depending on the sub-scanning pitch can be easily obtained by only calculating values of σ1 and σ2 by simple measurement.

Further, especially in high-resolution read-out in which the sub-scanning pitch is not larger than 50 μm or 25 μm, the influence of radiation energy release caused by scattering of the stimulating light is suppressed and the radiation image can be read out at higher sensitivity.

When a stimulable phosphor sheet containing therein blue pigment is employed, scattering of the stimulating light is more suppressed than when a white stimulable phosphor sheet is employed and the radiation image can be read out at a higher resolution.

The radiation image read-out apparatus of the present invention need not be limited to the illustrated embodiment but may be variously modified. For example, the light source, the light collecting optical system between the light source and the stimulable phosphor sheet, the optical system between the stimulable phosphor sheet and the photoelectric convertor means and the photoelectric convertor means may be of any various known structures. Further, the radiation image read-out apparatus may be further provided with an image processing system for variously processing the image signal output from the radiation image read-out apparatus or an eraser means which causes erasing light to scan the stimulable phosphor sheet to fully release the residual radiation energy after read-out of an image.

What is claimed is:

1. A radiation image read-out method in which a stimulable phosphor sheet stored thereon a radiation image is two-dimensionally scanned by a stimulating light beam by projecting the light beam along a main scanning line extending in a main scanning direction and moving one of the stimulable phosphor sheet and the stimulating light beam in a sub-scanning direction relatively to the other so that the stimulable phosphor sheet is exposed to the stimulating light beam along a plurality of main scanning lines arranged in the sub-scanning direction at a predetermined pitch and stimulated emission emitted from the part of the stimulable phosphor sheet exposed to the stimulating light beam is photoelectrically converted to an electric image signal by a photoelectric convertor means, wherein the improvement comprises the step of controlling the power of the stimulating light beam depending on the pitch at which the main scanning lines are arranged in the sub-scanning direction.

2. A radiation image read-out method as defined in claim 1 in which the power I of the stimulating light beam is controlled in the range of a half of $I_0$ represented by the following formula (1) to twice the same, $$I_0 = 1/\sigma_1 \cdot \ln(1+\sigma_2/\sigma_1) \tag{1}$$

wherein $\sigma_1$ is an absorption factor based on the retention of radiation energy represented by the ratio of an output signal of the photoelectric convertor means when the stimulating light is projected onto a first part of a stimulable phosphor sheet storing therein radiation energy to that when the stimulating light is projected onto a second part of the stimulable phosphor sheet deviated from the first part in the sub-scanning direction, $\sigma_2$ is an absorption factor based on the read-out efficiency represented by the ratio of an output signal of the photoelectric convertor means when the stimulating light is projected onto a stimulable phosphor sheet storing therein radiation energy to the power of the stimulating light.

3. A radiation image read-out apparatus comprising stimulating light projecting means which two-dimensionally scans a stimulable phosphor sheet stored thereon a radiation image with a stimulating light beam by projecting the light beam along a main scanning line extending in a main scanning direction and moving one of the stimulable phosphor sheet and the stimulating light beam in a sub-scanning direction relatively to the other so that the stimulable phosphor sheet is exposed to the stimulating light beam along a plurality of main scanning lines arranged in the sub-scanning direction at a predetermined pitch and a photoelectric convertor means which detects stimulated emission emitted from the part of the stimulable phosphor sheet exposed to the stimulating light beam and photoelectrically converts the stimulated emission to an electric image signal, wherein the improvement comprises a stimulating light power controlling means which controls the power of the stimulating light beam depending on the pitch at which the main scanning lines are arranged in the sub-scanning direction.

4. A radiation image read-out apparatus as defined in claim 3 in which For example, the stimulating light power controlling means controls the power I of the stimulating light beam in the range of a half of $I_0$ represented by the following formula (1) to twice the same, $$I_0 = 1/\sigma_1 \ln(1+\sigma_2/\sigma_1) \tag{1}$$

wherein $\sigma_1$ is the absorption factor based on the retention of radiation energy represented by the ratio of an output signal of the photoelectric convertor means when the stimulating light is projected onto a first part of a stimulable phosphor sheet storing therein radiation energy to that when the stimulating light is projected onto a second part of the stimulable phosphor sheet deviated from the first part in the sub-scanning direction, $\sigma_2$ is the absorption factor based on the read-out efficiency represented by the ratio of an output signal of the photoelectric convertor means when the stimulating light is projected onto a stimulable phosphor sheet storing therein radiation energy to the power of the stimulating light.

5. A radiation image read-out apparatus as defined in claim 3 in which the sub-scanning pitch is not larger than 50 µm.

6. A radiation image read-out apparatus as defined in claim 5 in which the sub-scanning pitch is not larger than 25 µm.

* * * * *